United States Patent
Lee et al.

(10) Patent No.: US 7,322,797 B2
(45) Date of Patent: Jan. 29, 2008

(54) DAMPER COOLED TURBINE BLADE

(75) Inventors: Ching-Pang Lee, Cincinnati, OH (US); Steven Robert Brassfield, Cinncinati, OH (US); Jan Christopher Schilling, Middletown, OH (US)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 11/296,910

(22) Filed: Dec. 8, 2005

(65) Prior Publication Data

US 2007/0134099 A1 Jun. 14, 2007

(51) Int. Cl.
  *F01D 5/26* (2006.01)
(52) U.S. Cl. .................. 416/193 A; 415/115; 416/500
(58) Field of Classification Search ................ 415/115, 415/116, 117, 121.2; 416/193 A, 193 R, 416/219 R, 248, 500
See application file for complete search history.

(56) References Cited

U.S. PATENT DOCUMENTS

| | | | |
|---|---|---|---|
| 4,872,812 A | 10/1989 | Hendley | |
| 5,382,135 A | 1/1995 | Green | |
| 5,478,207 A * | 12/1995 | Stec | 416/219 R |
| 5,749,705 A * | 5/1998 | Clarke et al. | 416/190 |
| 5,813,835 A | 9/1998 | Corsmeier et al. | |
| 5,924,699 A | 7/1999 | Airey et al. | |
| 6,171,058 B1 | 1/2001 | Stec | |
| 6,932,575 B2 * | 8/2005 | Surace et al. | 416/193 A |
| 2005/0079062 A1 | 4/2005 | Surace et al. | |

OTHER PUBLICATIONS

GE Aircraft Engines, "CF6-80C2 HPT Stage 2 Blade," on sale and in public use in US more than one year before Oct. 31, 2005.
GE Aircraft Engines, "HPT Stage 1 Blade and Damper Assembly," on sale in US more than one year before Oct. 31, 2005.
U.S. Appl. No. 10/903,414, filed Jul. 30, 2004, S. Keith et al.
U.S. Appl. No. 10/909,199, filed Jul. 30, 2004, S. Keith et al.
U.S. Appl. No. 10/903,634, filed Jul. 30, 2004, S. Keith et al.

* cited by examiner

*Primary Examiner*—Edward K. Look
*Assistant Examiner*—Dwayne J White
(74) *Attorney, Agent, or Firm*—William S. Andes; Francis L. Conte

(57) ABSTRACT

A turbine blade includes an airfoil, platform, shank, and dovetail integrally joined together. A cooling chamber is located under the platform and has a portal exposed outwardly from the shank. A damper seat surrounds the portal and is recessed under the platform for receiving a vibration damper to sealingly close the chamber across the portal.

39 Claims, 7 Drawing Sheets

DAMPER COOLED TURBINE BLADE

BACKGROUND OF THE INVENTION

The present invention relates generally to gas turbine engines, and, more specifically, to turbine blade cooling therein.

In a gas turbine engine, air is pressurized in a compressor and mixed with fuel in a combustor for generating hot combustion gases. Energy is extracted from the gases in a high pressure turbine (HPT) which powers the compressor, and in a low pressure turbine (LPT) which typically powers a fan in an aircraft turbofan engine application.

The HPT includes a stator nozzle disposed at the outlet end of the combustor which first receives the hottest combustion gases therefrom. The nozzle includes a row of vanes which direct the combustion gases into a row of first stage turbine rotor blades mounted to the perimeter of a supporting rotor disk.

The stator vanes and rotor blades have specifically configured airfoil profiles with generally concave pressure sides and generally convex opposite suction sides extending in radial span, and extending in chord between opposite leading and trailing edges. The airfoils are hollow and include various cooling circuits therein for channeling therethrough a portion of pressurized air bled from the compressor for cooling the airfoils during operation and extending the useful life thereof.

The cooling circuits for the stator vanes and rotor blades vary in complexity, performance, and cost of manufacture in a multitude of permutations in a remarkably complex and crowded art due to the decades of development history in modern gas turbine engines.

Even the smallest change in the cooling circuits for these turbine components can have a significant and profound benefit in durability, life, and cost of the resulting turbine component. The various configurations of cooling circuits are due to the different operating environments of the turbine airfoils, including the different velocity, pressure, and temperature distribution over the opposite pressure and suction sides thereof over the span and chord of the airfoils.

Furthermore, a turbine rotor blade is subject to centrifugal forces when rotating with the perimeter of the supporting rotor disk. The turbine blade includes an airfoil extending in radial span from a root at an inner platform to a radially outer tip.

The platforms of the full row of turbine blades define the radially inner flowpath boundary for confining the hot combustion gases at the roots of the airfoils, with an annular turbine shroud confining the combustion gases around the radially outer tips of airfoils.

The platforms are integrally formed at the outer end of a supporting shank which terminates in a supporting dovetail having tangs or lobes configured for being retained in complementary dovetail slots formed in the perimeter of the supporting rotor disk.

The turbine blade is hollow with one or more cooling circuits extending from the base of the dovetail, through the shank and platform and into the airfoil for circulating pressurized air bled from the compressor for cooling the blade during operation.

As indicated above, the cooling circuits inside the turbine airfoil itself may have a myriad of configurations specifically tailored for the operating environment of the turbine airfoil within the combustion gas streamlines. The cooling circuits are fed by inlet channels extending through the shank which receive the pressurized air from the base of the dovetail inside the supporting rotor disk.

The individual blades are retained on the supporting disk typically utilizing forward and aft blade retainers which also provide corresponding seals.

Since the blade shanks and dovetails are shielded from the hot combustion gases by the blade platforms they are readily cooled directly by the cooling air channeled therethrough and by any air surrounding the shanks and dovetails within the sealed cavities of the turbine.

However, the blade platform itself is exposed on its outer side directly to the hot combustion gases and is cooled in part by the cooling air channeled through the internal cooling circuits, as well as in additional part by cooling air channeled under the platform itself. In some configurations, the platform may include conventional film cooling holes extending radially therethrough which bleed a portion of the cooling air from under the platform to its outer surface to create a protective thermally insulating film of cooling air thereover during operation.

The efficiency of a gas turbine engine is increased primarily by increasing the operating temperature of the combustion gases, which correspondingly requires temperature resistant superalloys for the various turbine components and corresponding cooling thereof.

Cooling of the turbine rotor blade platforms is particularly problematic because the platform should be as thin as practical to reduce centrifugal loads carried through the turbine blades, and correspondingly reduce centrifugal stress. Thin platforms render impractical the introduction of internal cooling circuits therein in the myriad of configurations found for the relatively thicker turbine airfoils themselves. And, film cooling of the turbine platforms themselves necessarily has limited effectiveness given the limited amount of cooling air that may be bled from the compressor, which correspondingly reduces overall efficiency of the engine.

Accordingly, it is desired to provide a turbine rotor blade having improved platform cooling for further increasing the efficiency of operation of the gas turbine engine.

BRIEF DESCRIPTION OF THE INVENTION

A turbine blade includes an airfoil, platform, shank, and dovetail integrally joined together. A cooling chamber is located under the platform and has a portal exposed outwardly from the shank. A damper seat surrounds the portal and is recessed under the platform for receiving a vibration damper to sealingly close the chamber across the portal.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
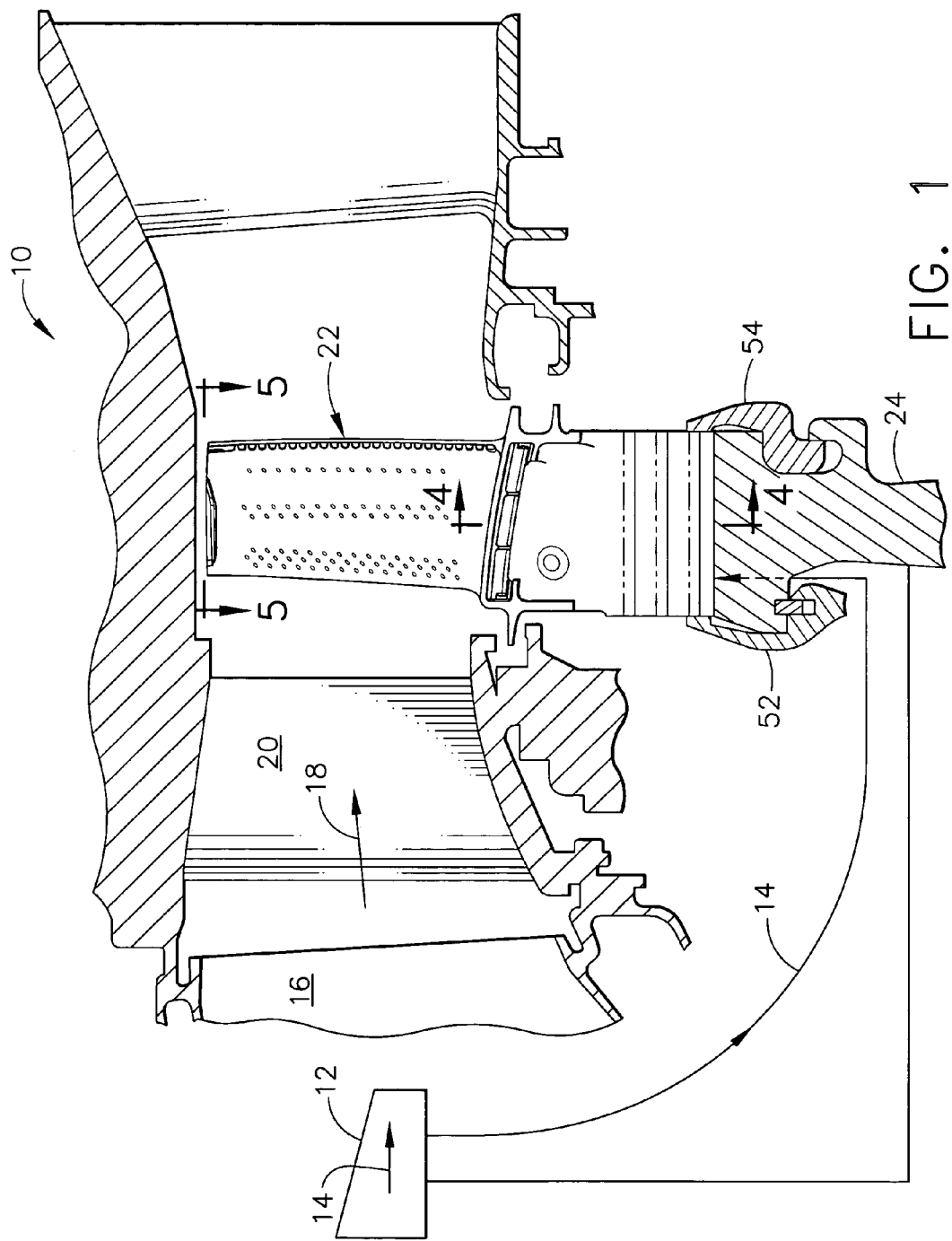
FIG. 1 is a partly sectional, schematic view of a portion of a turbofan gas turbine engine including a high pressure turbine therein.

Illustrated in FIG. 1 is an axial sectional view of a portion of a turbofan gas turbine aircraft engine 10 which is axisymmetrical about a longitudinal or axial centerline axis.

The engine 10 includes a conventional multistage axial compressor 12 configured for pressurizing air 14 in succeeding stages thereof and providing the compressed air to a conventional annular combustor 16 shown in aft part. Fuel is added to the pressurized air in the combustor and ignited for generating hot combustion gases 18 which are discharged therefrom into a HPT.

The HPT includes a first stage turbine nozzle having a row of hollow nozzle stator vanes 20 which channel the combustion gases aft through a row of first stage turbine rotor blades 22 conventionally mounted to a supporting rotor disk 24 shown in radially outer part. Energy is extracted by the turbine blades 22 which are connected by a drive shaft to the rotor of the compressor for powering the compressor during operation. The combustion gases leave the HPT and enter a conventional LPT which extracts further energy therefrom for typically powering an upstream fan (not shown) in the typical turbofan aircraft engine application.

Figure 2:
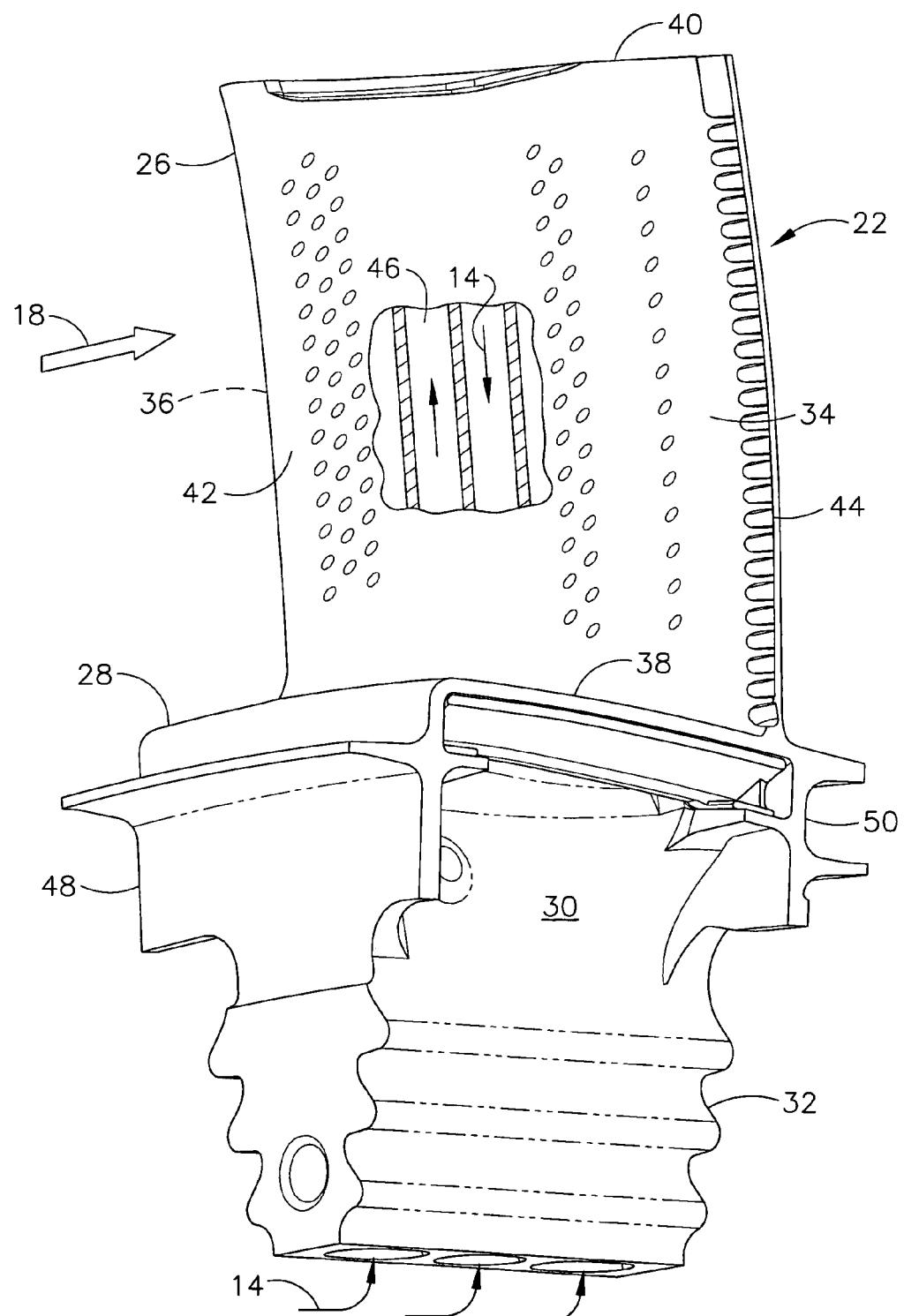
FIG. 2 is a isolated isometric view of one of the first stage turbine rotor blades illustrated in FIG. 1.
Figure 3:
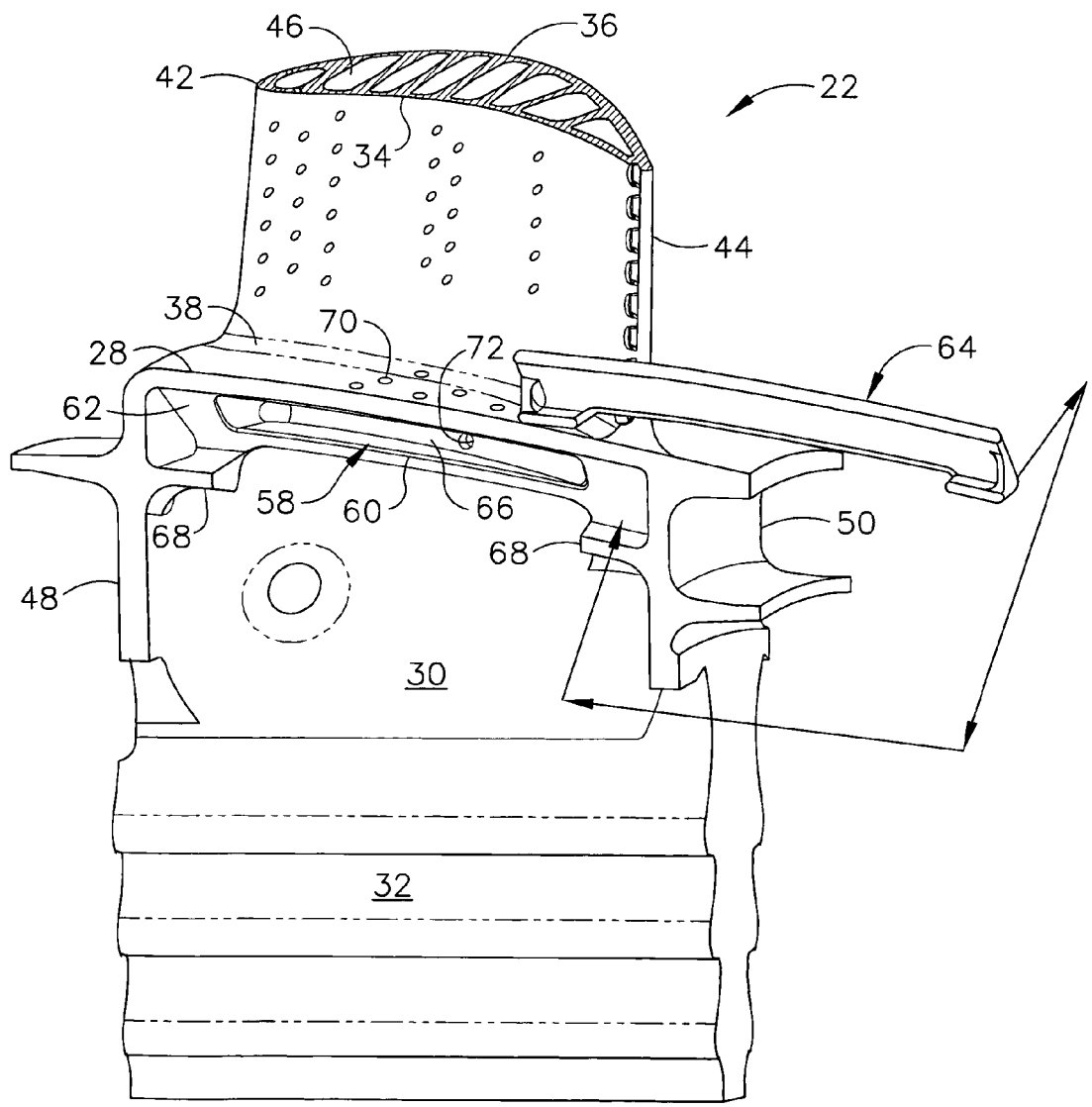
FIG. 3 is an exploded view of the platform portion of the blade illustrated in FIG. 2 with the blade vibration damper removed from its complementary mounting seat under the blade platform.

FIGS. 2 and 3 illustrate in isolation an exemplary one of the turbine rotor blades 22 shown in FIG. 1. Each blade includes an airfoil 26, a platform 28, shank 30, and dovetail 32 integrally joined together longitudinally or radially in turn in a unitary casting formed of a typical superalloy metal for use in the hostile environment of the HPT.

The airfoil 26 includes a generally concave pressure side 34 and a circumferentially or laterally opposite, generally convex suction side 36 extending radially in span from a root 38 at the top or outside of the platform 28 to an opposite radially outer distal tip 40. The two sides also extend axially in chord between axially opposite leading and trailing edges 42,44 between which the hot combustion gases 18 flow during operation.

The airfoil 26 is hollow between the two sides and includes an internal cooling circuit 46 extending throughout the majority of the airfoil, through the platform 28 and the shank 30 with corresponding inlets disposed in the base of the dovetail 32 for receiving the pressurized cooling air 14 from the compressor during operation.

The cooling circuit 46 may have any conventional configuration and typically includes multiple flow channels inside the airfoil itself configured for effecting impingement cooling or serpentine cooling therein in conventional manners. The cooling air is discharged from the airfoil through a multitude of aperture outlets typically in the form of inclined film cooling holes over the pressure and suction sides of the airfoil, as well as through a row of trailing edge outlet holes along the full span of the trailing edge.

As initially shown in FIGS. 2 and 3, the platform 28 defines the radially inner boundary for the hot combustion gases 18 and may have any conventional configuration as modified hereinbelow for improving cooling thereof. For example, the blade typically includes a conventional forward skirt 48 integrally joined to the shank 30 and platform 28 at the forward or upstream ends thereof in the common casting. The forward skirt 48 typically includes a forwardly projecting angel wing seal which seals the platform to the upstream turbine nozzle illustrated in FIG. 1.

The blade also includes a conventional aft skirt 50 integrally joined to the shank 30 and platform 28 at the aft ends thereof in the common casting. The aft skirt 50 typically includes a pair of aft projecting angel wing seals which seal the platform with the downstream turbine nozzle of the LPT illustrated in FIG. 1.

FIG. 1 also illustrates a conventional forward blade retainer 52 on the forward side of the supporting disk 24, and a conventional aft blade retainer 54 on the aft side of the supporting disk 24 which axially retain the dovetails in their complementary axial dovetail slots in the perimeter of the supporting disk 24. The two retainers may also be configured for sealing the dovetails to the perimeter of the disk to define a portion of the conventional bleed path from the compressor to the turbine blades for channeling the cooling air thereto in a conventional manner.

Figure 4:
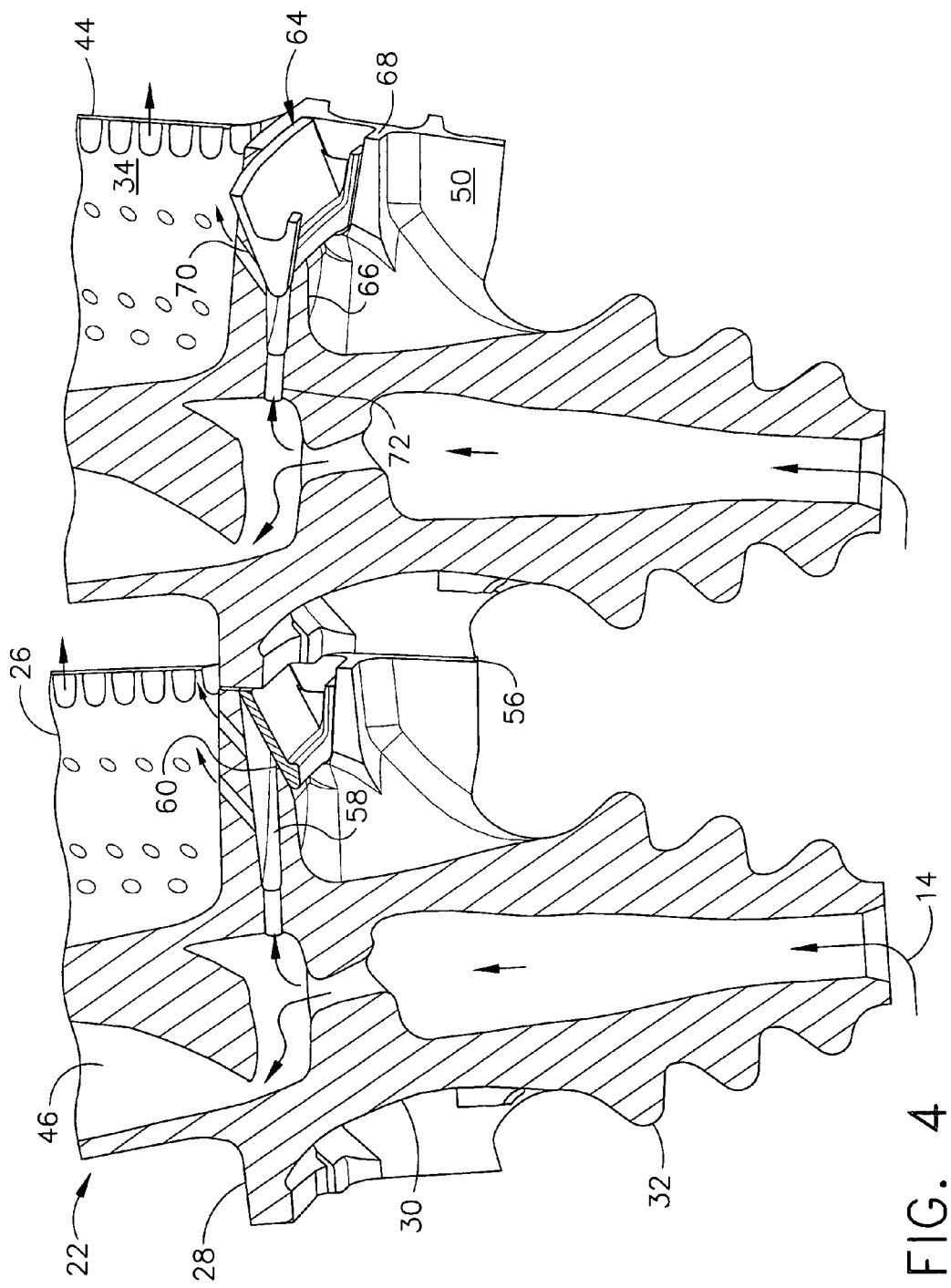
FIG. 4 is a radial sectional view through two adjacent turbine blades illustrated in FIG. 1 and taken along line 4-4.
Figure 5:
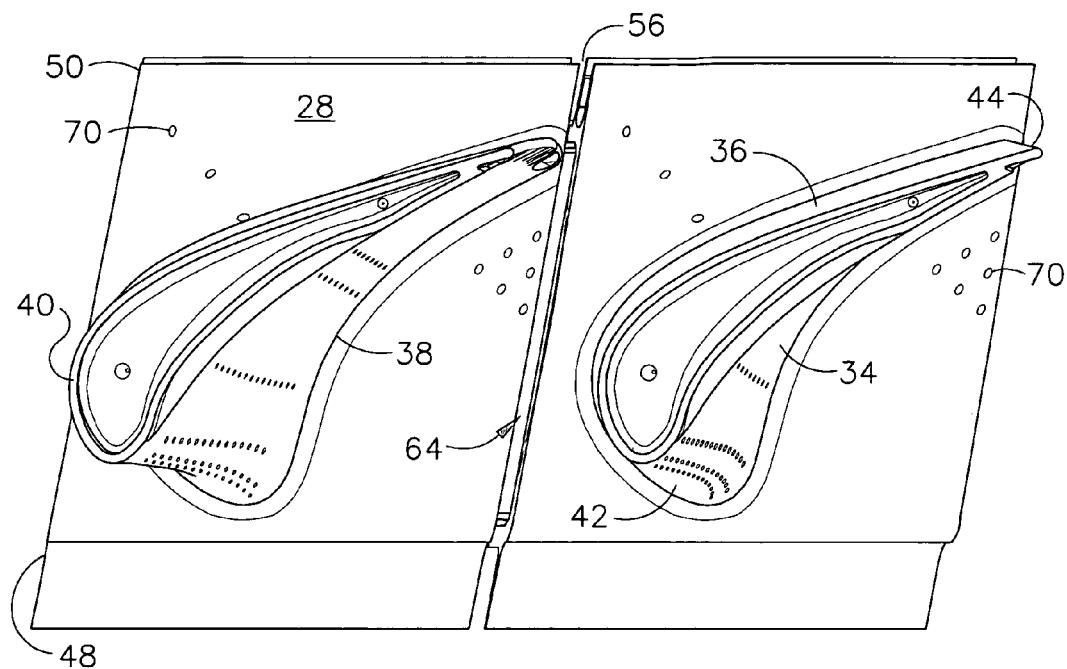
FIG. 5 is a top view of the two adjacent turbine blades shown in FIG. 1 and taken along line 5-5.

FIGS. 4 and 5 illustrate two of the turbine rotor blades which circumferentially adjoin each other in the full row thereof when mounted to the perimeter of the supporting disk. Each platform 28 is a relatively thin plate having a rectangular or parallelogram outer profile as best illustrated in FIG. 5 and includes portions extending circumferentially outwardly from both the pressure and suction sides 34,36 of the airfoil.

Adjacent platforms of adjacent blades adjoin each other at a corresponding axial splitline 56. In this way, each platform 28 terminates in the axial direction at the forward and aft skirts 48,50, and terminates in the circumferential direction at the opposite splitlines 56 between adjacent blades.

Each platform therefore extends from the root of the airfoil outwardly from the pressure side 34 to terminate at the pressure side edge of the platform along the splitline 56. And, each platform extends outwardly from the opposite suction side 36 and terminates at the corresponding suction side edge along the corresponding splitline 56.

As initially shown in FIG. 3, each platform 28 includes a platform cooling chamber 58 disposed radially under the platform itself and extending outwardly from the shank. The cooling chamber 58 includes an entrance or portal 60 which faces or is exposed outwardly from the shank 30 towards the next adjacent blade and platform.

Figure 6:
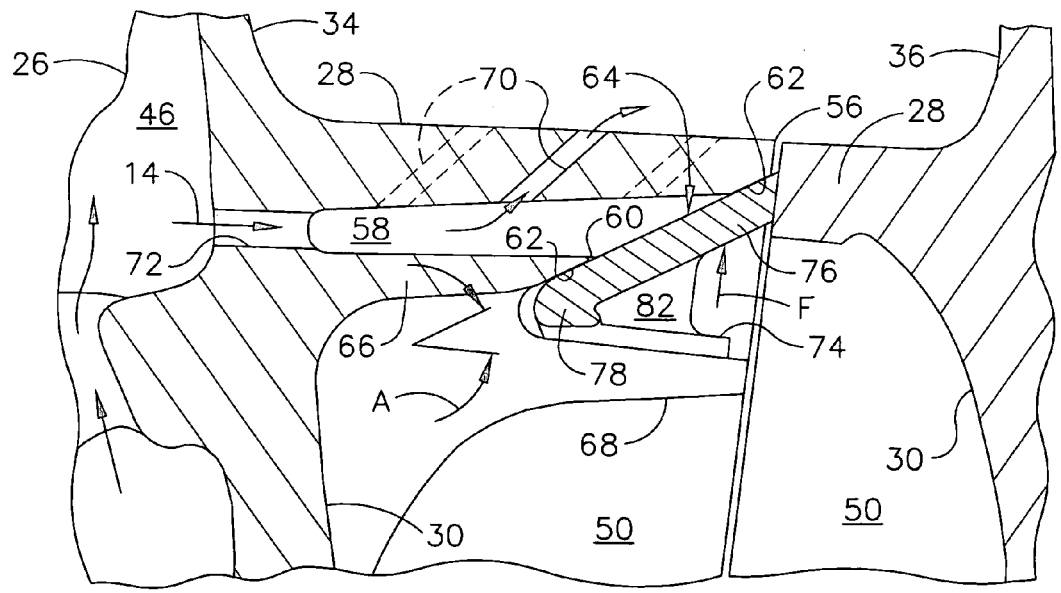
FIG. 6 is an enlarged radial sectional view of corresponding portions of the two adjacent turbine blades illustrated in FIG. 4 with the vibration damper being trapped circumferentially therebetween.

Surrounding each portal 60 under the platform 28 is a damper seat 62 specifically configured for receiving or engaging a complementary vibration damper 64 to both dampen vibration of the blades during operation and sealingly close the exposed platform chamber 58 across the full open area of the portal 60. The damper 64 is illustrated in FIG. 3 removed from its complementary seat 62 under the platform. In FIGS. 4 and 6 the damper 64 is shown in transverse radial section mounted in the seat 62 and trapped circumferentially between adjacent platforms.

As illustrated in enlarged sectional view in FIG. 6, the chamber portal 60 and surrounding seat 62 are inclined outwardly from the shank 30 to the platform 28 at the corresponding splitline 56 at an acute inclination angle A which is preferably about 30 degrees. In this way, the damper 64 is loosely trapped between adjacent platforms and is supported by the seat 62 under frictional force at the corresponding inclination angle A when the blades rotate during operation and develop centrifugal force F in the damper 64 itself.

The inclination angle A along which both the seat 62 and cooperating damper 64 are disposed induces frictional engagement forces between the damper and seat during rotary operation of the blades which is effective for damping vibration of the blades, while simultaneously sealing closed the portal 60 to the under platform cooling chamber 58. Under the centrifugal force F the inclined damper 64 will slide slightly to close the inter-platform gap at the splitlines 56, with the damper abutting the circumferential edge of the next adjacent platform preventing its further movement.

As best shown in FIG. 3, the platform chamber 58 is spaced axially between the two skirts 48,50 to bridge the surrounding damper seat 62 axially across the full width of the chamber and across the opposite ends of the portal 60.

As best shown in FIG. 6, the platform chamber 58 is bounded on its top or outer side by the platform 28 itself and is bounded on its inner or lower side by a thin shelf or floor 66 extending integrally and outwardly from the shank 30 towards the next adjacent splitline 56. The damper seat 62 also bridges the floor 66 at is distal end and the distal end or edge of the platform at the splitline 56 aligned therewith along the acute inclination angle A.

As shown in face view in FIG. 3, the damper seat 62 therefore surrounds the full perimeter of the platform chamber 58 around the entrance portal 60 thereof to provide a corresponding border or land against which the damper 64 may frictionally engage to seal closed the chamber from this exposed end.

To support the loose damper between adjacent platforms, the blade illustrated in FIG. 3 also includes a pair of support ledges 68 integrally joined to the inside of respective ones of the forward and aft skirts 48,50 and the common shank 30 therebetween which ledges are spaced radially below the platform 28 and portal 60 for creating corresponding recesses or pockets for supporting the opposite ends of the damper 64 adjacent the portal 60.

FIG. 6 illustrates in enlarged view one of the end ledges 68 which supports the damper 64 from below, with the damper being retained from above by the complementary damper seat 62, with the damper being circumferentially trapped in the pockets above the ledges 68 by the next adjacent platform.

In the preferred embodiment illustrated in FIG. 6, the platform chamber 58 extends under the platform 28 circumferentially outwardly from the airfoil pressure side 34, and the damper 64 is trapped under the pressure side platform by the next adjacent suction side platform.

Friction dampers have been commonly used for many years in commercial public use in turbofan aircraft engines for providing frictional dissipation of vibratory excitation forces between the damper and the platform itself. However, the conventional damper is relatively small in profile and sized simply to engage the corresponding edge of the platform and is therefore limited in size and location and centrifugal loads generated therefrom which must be carried through the supporting platforms and radially inwardly through the shank and dovetail into the supporting rotor disk.

FIG. 6 illustrates the introduction of the platform cooling chamber 58 by the simple introduction of the additional chamber floor 66 which is cantilevered outwardly from the shank 30 to define the portal 60 to the chamber and the lower portion of the surrounding damper seat 62. The seat 62 is flat or even in smooth surface finish around the full perimeter or border of the portal 60 and provides a full perimeter border to frictionally engage or contact the complementary damper 64 to seal closed the chamber 58 under centrifugal loads.

The chamber 58 illustrated in FIG. 3 is a unitary or single cell chamber in the preferred embodiment extending over the majority of the axial length of the platform between the two skirts, and the damper 64 is specifically configured larger than conventional dampers to seal closed the newly provided platform chamber 58. The chamber in alternate embodiments could have multiple cells if desired, but the additional bifurcation ribs required therefor would add unnecessary weight subject to centrifugal loads, and should be eliminated where practical.

In the preferred embodiment illustrated in FIG. 6, the damper seat 62 is straight in height across the height of the portal 60 and along the acute inclination angle A. As shown in FIG. 3, the damper 64 is also arcuate or convex along the corresponding edges of the splitline 56 and chamber floor 66 between the forward and aft skirts 48,50. The damper 64 complements its mating seat 62 around the portal, and is similarly straight across its transverse width, while being convex along its longitudinal length. The convex configuration of the damper seat and the damper itself helps center the damper in frictional engagement over the chamber portal 60 and maximizes frictional damping capability and frictional contact sealing of the chamber.

By sealing the platform chamber 58, the pressurized cooling air 14 may be channeled therethrough in various circuits for enhancing underside cooling of the platform during operation. For example, the platform 28 illustrated in FIGS. 3, 4, and 6 includes a plurality of film cooling hole outlets 70 extending through the platform at a suitable shallow inclination angle and disposed in flow communication with the platform chamber 58. In this way, the spent cooling air from the chamber 58 may be discharged through the platform for providing a thermally insulating blanket of cooling air on the outer surface thereof for thermally protecting the platform during operation.

As indicated above, the airfoil itself has the dedicated cooling circuit 46 therein which conveniently passes radially upwardly through the shank and immediately adjacent to the cooling chamber 58 illustrated in FIG. 6. Accordingly, the shank 30 may include one or more aperture inlets 72 hidden inside the back end of the chamber 58 where it joins the shank, which inlet 72 extends in flow communication between the internal cooling circuit 46 of the airfoil and the platform chamber 58.

In this way, a portion of the pressurized cooling air flowing into the airfoil is diverted through the inlet 72 into the platform chamber 58 which is closed by the damper 64 during operation. The air thus cools the underside of the platform 28 within the bounds of the relatively large chamber 58, with the spent cooling air then being discharged through the film cooling outlets 70 to cool the outside of the platform.

Figure 7:
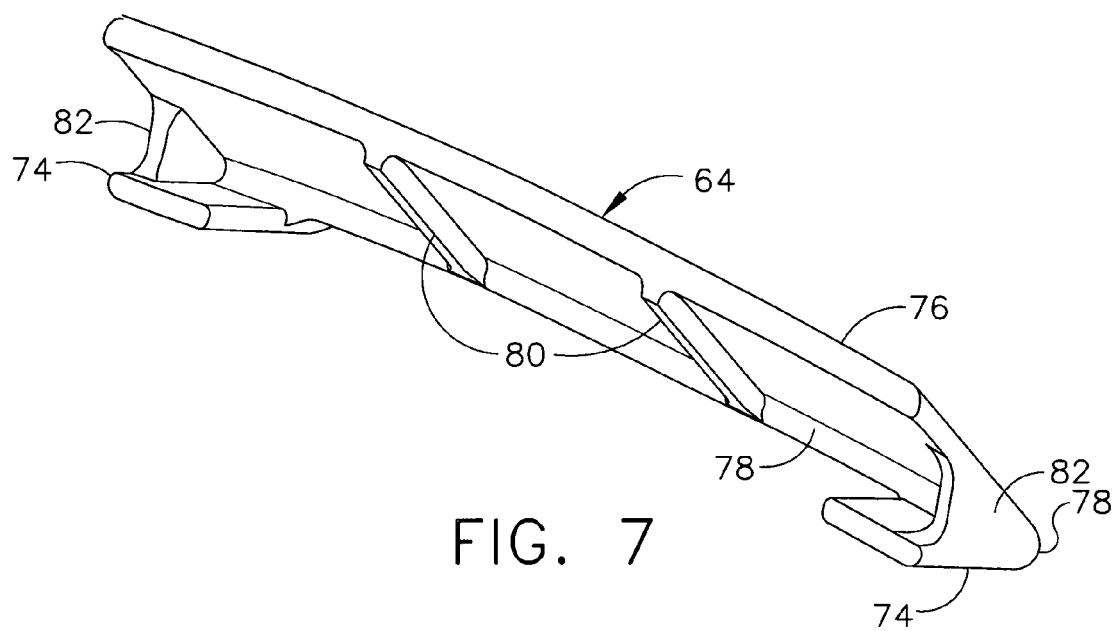
FIG. 7 is an isolated view of the vibration damper illustrated in the previous figures, in another embodiment.

Since the damper 64 closes shut the exposed portion 60 of the platform chamber 58 under centrifugal loads, the damper is preferably imperforate without any holes therethrough which would compromise the sealing capability thereof. FIG. 7 illustrates in isolation this form of the imperforate damper 64 specifically configured to complement the portal 60 of the chamber and the inclined damper seat 62.

More specifically, the damper 64 illustrated in FIGS. 6 and 7 includes a pair of feet or wedges 74 integrally joined together by a central damper plate 76 extending integrally therebetween in a common casting of a suitable superalloy metal for use in the turbine blade. As shown in FIG. 6, the wedges 74 provide stands at the opposite ends of the damper which are simply supported to rest atop the corresponding ledges 68 under the platform.

The supporting wedges 74 maintain the preferred acute inclination angle A of the damper plate 76 itself to match the inclination of the damper seat 62 around the chamber portal 60. The damper plate 76 therefore frictionally abuts or covers the entire portal 60 for contact sealing closed the platform chamber 58 under centrifugal loads on the damper itself.

The sectional configuration of the damper 64 illustrated in FIG. 6 is wedge shaped to provide the desired acute inclination angle A. The damper seat 62 is configured with a relatively long platform 28 and a relatively short chamber floor 66 to match the shallow inclination angle A. And, the platform chamber 58 itself may also have a corresponding wedge shape diverging outwardly from the inlet 72 for diffusing and distributing the pressurized air throughout the chamber 58 for providing underside cooling of the platform prior to discharge through the film cooling outlet 70.

The damper 64 illustrated in FIGS. 6 and 7 preferably also includes a solid ridge 78 integrally joining together the two wedges 74 along the bottom edge of the damper plate 76 to form a common and solid apex of the damper and wedges. The ridge 78 is complementary to the chamber floor 66 along the inner portion of the portal 62.

The ridge 78 of the damper provides an effective lower seal with the distal end of the chamber floor 66, with the chamber floor 66 carrying in turn some of the centrifugal loads from the damper carried through the ridge. The damper floor 66 is relatively short and is cantilevered from the side of the shank 30 and provides a rigid support for carrying the centrifugal loads from the damper ridge 78. Since the entire damper 64 operates under centrifugal load, those loads must be suitably carried by the damper itself and into the platform and chamber floor 66 without unacceptable increase in centrifugal stress therefrom.

The damper illustrated in FIG. 7 may optionally include one or more integral reinforcing ribs 80 extending transversely outwardly from the common ridge 78 for increasing the structural rigidity of the damper plate when mounted over the exposed portal 60 illustrated in FIG. 6. The ribs 80 carry centrifugal loads across the height of the portal 60 between the platform over the chamber and the chamber floor 66. And, since the portal 60 is fully bounded by the damper seat under the platform, that seat increases the structural rigidity of the platform where it joins the shank, and through which the centrifugal damper loads are carried to the shank and dovetail and into the supporting rotor disk.

The two end wedges 74 illustrated in FIG. 7 may further include integral side gussets 82 which extend back from the common ridge 78 only in small part. In this way, with a minimum of added weight due to the side gussets 82, the damper may be formed of relatively thin material and selectively reinforced for maximizing its rigidity while minimizing weight and centrifugal loads. The side gussets 82 may be used in the embodiment of the damper illustrated in the previous Figures, with that embodiment lacking the reinforcing ribs 80, where practical.

Figure 8:
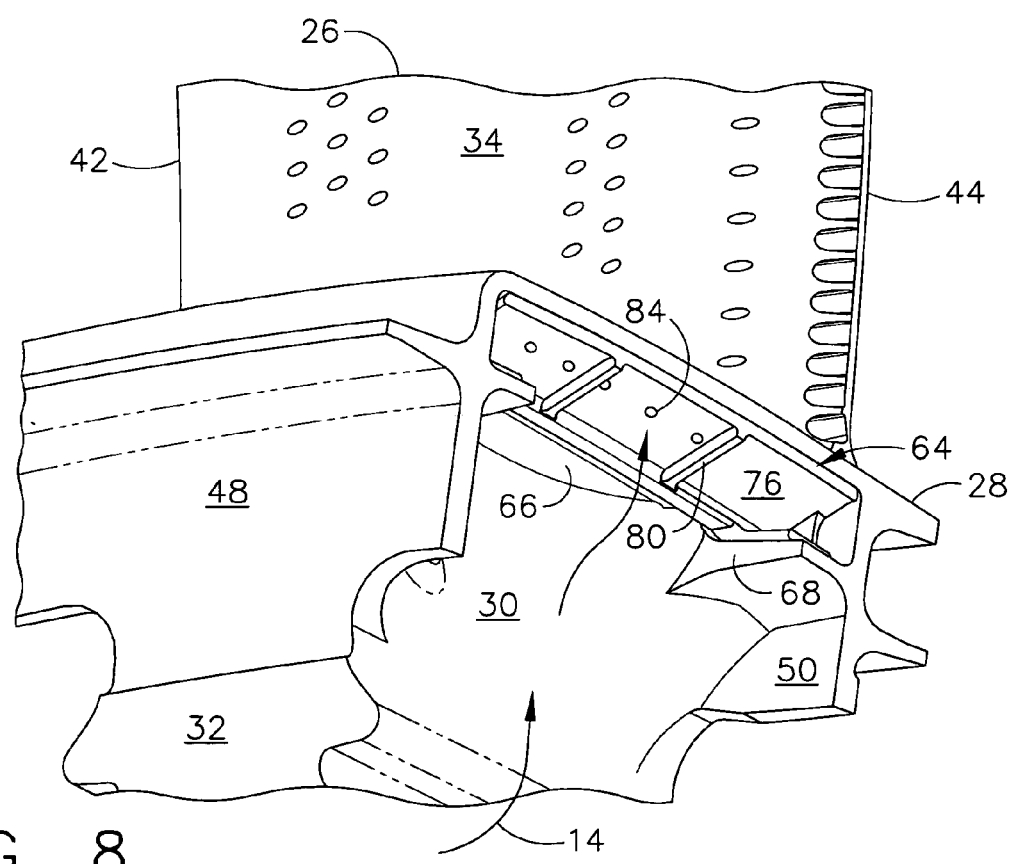
FIG. 8 is an isometric view of the blade platform in accordance with another embodiment of the vibration damper mounted therein.
Figure 9:
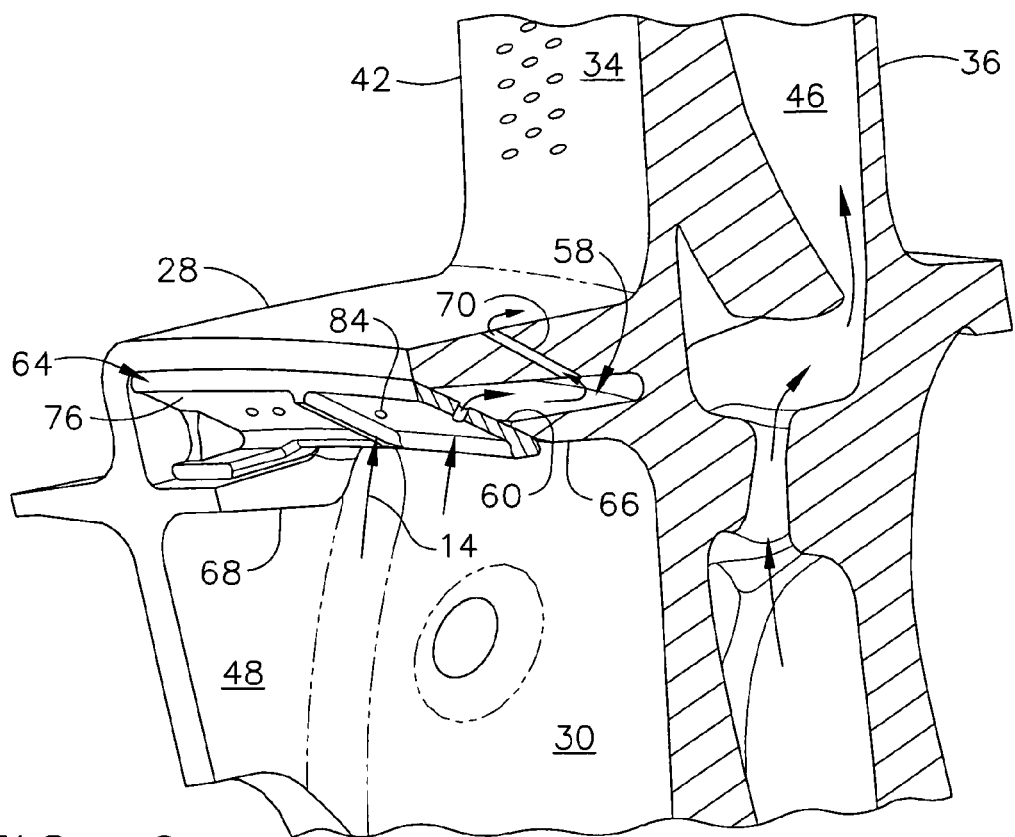
FIG. 9 is a radial sectional view of the damper and platform illustrated in FIG. 8.

The turbine blade is illustrated in FIGS. 8 and 9 in an alternate embodiment of the platform cooling chamber 58 and cooperating vibration damper 64. In this embodiment illustrated in FIG. 9, the chamber 58 is imperforate where it meets the shank 30 and is not joined in flow communication with the cooling circuit 46 inside the shank and airfoil. Accordingly, the chamber 58 is imperforate around its entire boundary except at the open portion 60 which is covered during operation by the cooperating damper 64.

In this embodiment, the damper 64 is perforate for channeling the available cooling air from below the platforms into the cooling chamber 58 as shown in both FIGS. 8 and 9.

The damper plate 76 closes the chamber portal 60 and includes a plurality of impingement holes 84 facing inwardly toward the underside of the platform 28 for directing the pressurized cooling air 14 in impingement cooling thereof. The spent impingement air then circulates through the cooling chamber 58 itself for providing convection cooling thereof, with the spent air being discharged through the film cooling outlets 70 extending through the platform 28 itself.

The impingement holes 84 are arranged in a single line along the length of the damper 64 and directly face the inner surface of the platform for impingement cooling thereof. The line of impingement holes minimizes stress concentrations in the damper which is subject to centrifugal force during operation. And, the reinforcing ribs 80 may be used in the damper for increasing its strength when the impingement holes 84 are also used therein.

Figure 10:
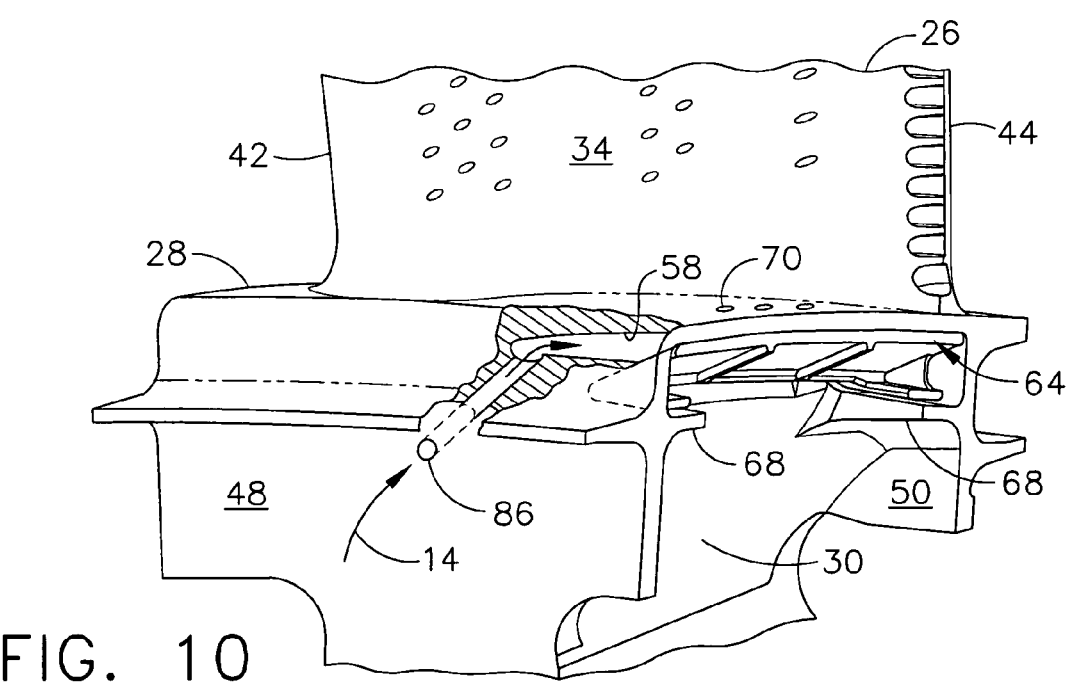
FIG. 10 is a partly sectional and cutaway view of the turbine blade platform and a vibration damper trapped therein in accordance with another embodiment.

FIG. 10 illustrates yet another embodiment of the turbine blade in which the platform cooling chamber 58 is imperforate except at its entrance portal 60 and at the forward skirt 48. The chamber, like the embodiment illustrated in FIG. 9, is not disposed in flow communication with the internal cooling circuit 46.

Instead, the forward skirt 48 includes an aperture inlet 86 extending therethrough in flow communication with the platform chamber 58 adjacent the forward ledge 68. The inlet 86 extends through the forward skirt to the back of the chamber 58 where it joins the shank. In this way, pressurized cooling air available in the forward turbine cavity under the angel wing of the forward skirt may be channeled into the chamber for convection cooling therein prior to discharge from the chamber through the film cooling outlets 70 in the platform itself.

As indicated above with respect to FIG. 1, the turbine blades 22 are mounted to the perimeter of the supporting rotor disk and retained therein by the forward and aft blade retainers and seals 52,54. Pressurized cooling air is bled from the compressor and conventionally channeled to the turbine disk for cooling thereof, as well as cooling the turbine cavities forward and aft of the turbine disk, with a dedicated cooling circuit extending through the individual turbine blades themselves.

Accordingly, several sources of the high pressure cooling air are available in the region of the turbine blades for feeding the platform cooling chamber 58 in the several exemplary embodiments disclosed above.

In FIG. 6, the platform chamber 58 receives its cooling air directly from the internal cooling circuit 46 of the blade through the cooperating inlet 72. In FIG. 8, the platform chamber is otherwise imperforate and receives its cooling air from the impingement holes 84 in the damper itself which closes the portal end of the chamber. And, in FIG. 10 the chamber and damper are again imperforate, with the inlet 86 to the chamber extending through the forward skirt 48 for providing the cooling air to the chamber.

In the several embodiments disclosed above, simple modifications to otherwise conventional blade platforms and vibration dampers may be used to create the cooling chambers under the pressure side portions of the platforms that are sealed closed during operation by the vibration dampers loaded under centrifugal force. These modifications include the introduction of the damper shelf or floor 66 and a corresponding increase in size of the damper to close the exposed portal defining the entrance to the platform cooling chamber.

The sealing damper and the damper floor cooperate in a rigid assembly with the platform around the cooling chamber 58 to carry the additional centrifugal loads therefrom during operation. However, the overall mass or weight of an individual turbine blade and cooperating damper may not necessarily increase by introducing the damper seal. For example, the thickness of the platform and shank may be reduced to offset the increased mass from the larger damper and additional damper floor.

As shown in FIG. 6, the chamber 58 diverges outwardly from the shank, and the platform decreases in thickness towards the pressure side splitline 56. Since the added damper floor 66 increases the structural rigidity of the turbine blade where the shank joins the platform, the local reduction in thickness of the platform may be used to offset this additional weight without reducing the overall strength of the turbine blade in this region.

It is noted in FIGS. 4 and 5 that the damper 64 is provided solely under the pressure side portions of the blade platforms which are typically subject to the highest heat load from the combustion gases during operation. The dampers are trapped under the pressure side platform of one blade by the suction side platform of the next adjacent blade at the corresponding axial splitlines 56.

The suction side portions of the platforms 28 are subject to less heat load during operation and therefore additional film cooling outlets 70 may be provided therethrough and fed by the purge air found between blade platforms for cooling this portion of the platform in a conventional manner.

Accordingly, a new and improved turbine rotor blade is provided by the simple introduction of the platform cooling chamber 58 under the pressure side platforms thereof. And, a new and improved vibration damper 64 is also provided to specifically cooperate with the improved blade to enhance platform cooling thereof in a relatively simple combination. The platform cooling chamber may be integrally formed in the original casting of the turbine blade itself. And, the cooperating damper may be separately manufactured in any conventional manner, such as casting as well.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
   an airfoil, platform, shank, and dovetail integrally joined longitudinally together;
   a platform cooling chamber disposed under said platform and having a portal exposed outwardly from said shank;
   a damper seat recessed under said platform and surrounding said portal; and
   a damper disposed adjacent said seat to sealingly close said chamber across said portal.

2. A blade according to claim 1 further comprising:
   a forward skirt integrally joined to said shank and platform at forward ends thereof;
   an aft skirt integrally joined to said shank and platform at aft ends thereof, and said chamber is spaced between said skirts to bridge said seat across opposite ends of said portal; and
   a pair of ledges integrally joined to respective ones of said forward and aft skirts and said shank, and spaced below said platform and portal for supporting said damper adjacent said portal.

3. A blade according to claim 2 wherein said seat is inclined outwardly from said shank to said platform for frictionally supporting said damper at a corresponding inclination angle under centrifugal force.

4. A blade according to claim 3 wherein:
   said platform terminates at a splitline spaced outwardly from said airfoil;
   said chamber includes a floor extending outwardly from said shank; and
   said seat bridges said floor and said platform at said splitline to surround said chamber around said portals.

5. A blade according to claim 4 wherein said airfoil includes opposite pressure and suction sides extending in span from a root at said platform to an opposite tip, and extending in chord between opposite leading and trailing edges, and said chamber extends under said platform outwardly from said airfoil pressure side.

6. A blade according to claim 5 wherein said seat is flat around said portal and is inclined inwardly from said splitline over said ledges to said shank, and provides a perimeter border to frictionally engage said damper to seal closed said chamber.

7. A blade according to claim 6 wherein said platform includes a plurality of film cooling hole outlets extending therethrough in flow communication with said platform chamber.

8. A blade according to claim 7 wherein:
   said airfoil is hollow and includes a cooling circuit extending through said platform and shank; and
   said shank includes an aperture inlet extending in flow communication between said cooling circuit and said platform chamber.

9. A blade according to claim 7 wherein said chamber is imperforate except at said portal, and said damper is perforate for channeling cooling air into said chamber.

10. A blade according to claim 7 wherein:
    said chamber is imperforate except at said portal and said forward skirt; and
    said forward skirt includes an aperture inlet extending therethrough in flow communication with said chamber adjacent said adjoining ledge.

11. A turbine blade comprising:
    an airfoil, platform, shank, and dovetail integrally joined longitudinally together;
    a platform cooling chamber disposed under said platform and having a portal exposed outwardly from said shank; and a damper seat recessed under said platform and surrounding said portal for receiving a vibration damper to sealingly close said chamber across said portal.

12. A blade according to claim 11 wherein said seat is inclined outwardly from said shank to said platform for frictionally supporting said damper at a corresponding inclination angle under centrifugal force.

13. A blade according to claim 12 further comprising:
a forward skirt integrally joined to said shank and platform at forward ends thereof;
an aft skirt integrally joined to said shank and platform at aft ends thereof; and
said chamber is spaced between said skirts to bridge said seat across opposite ends of said portal.

14. A blade according to claim 13 wherein:
said platform terminates at a splitline spaced outwardly from said airfoil;
said chamber includes a floor extending outwardly from said shank; and
said seat bridges said floor and said platform at said splitline to surround said chamber around said portal.

15. A blade according to claim 14 further comprising a pair of ledges integrally joined to respective ones of said forward and aft skirts and said shank, and spaced below said platform and portal for supporting said damper adjacent said portal.

16. A blade according to claim 15 wherein said airfoil includes opposite pressure and suction sides extending in span from a root at said platform to an opposite tip, and extending in chord between opposite leading and trailing edges, and said chamber extends under said platform outwardly from said airfoil pressure side.

17. A blade according to claim 16 wherein said seat is flat around said portal and provides a perimeter border to frictionally engage said damper to seal closed said chamber.

18. A blade according to claim 17 wherein said seat is straight in height across said portal.

19. A blade according to claim 17 wherein said seat is convex along said splitline and floor between said forward and aft skirts.

20. A blade according to claim 17 wherein said platform includes a plurality of film cooling hole outlets extending therethrough in flow communication with said platform chamber.

21. A blade according to claim 20 wherein:
said airfoil is hollow and includes a cooling circuit extending through said platform and shank; and
said shank includes an aperture inlet extending in flow communication between said cooling circuit and said platform chamber.

22. A blade according to claim 21 further comprising said damper being disposed between said ledges and platform, and covering said portal to close said chamber.

23. A blade according to claim 22 wherein said damper is imperforate.

24. A blade according to claim 23 wherein said damper comprises a pair of wedges integrally joined together by a damper plate therebetween, and said wedges are disposed atop said ledges, and said plate covers said portal for sealing closed said platform chamber.

25. A blade according to claim 24 wherein said damper further comprises a ridge integrally joining together said wedges along said damper plate to form a solid apex being complementary to said chamber floor along said portal.

26. A blade according to claim 25 wherein said damper further comprises an integral rib extending outwardly from said ridge along said damper plate.

27. A blade according to claim 20 wherein said chamber is imperforate at said shank.

28. A blade according to claim 27 further comprising said damper being disposed between said ledges and platform, and covering said portal to close said chamber.

29. A blade according to claim 28 wherein said chamber is imperforate except at said portal, and said damper is perforate for channeling cooling air into said chamber.

30. A blade according to claim 28 wherein said damper plate includes a plurality of impingement holes facing inwardly through the underside of said platform for channeling said cooling air in impingement cooling thereof.

31. A blade according to claim 27 wherein said chamber is imperforate except at said portal and said forward skirt.

32. A blade according to claim 31 wherein said forward skirt includes an aperture inlet extending therethrough in flow communication with said chamber adjacent said adjoining ledge.

33. A blade according to claim 32 further comprising said damper being disposed between said ledges and platform, and covering said portal to close said chamber.

34. A blade according to claim 33 wherein said damper is imperforate.

35. A turbine blade damper comprising:
a pair of wedges integrally joined together by a thinner damper plate therebetween to define a hollow cavity behind said plate; and
a common ridge integrally joining together said wedges along said damper plate to form an evenly smooth apex therebetween.

36. A damper according to claim 35 wherein said wedges include side gussets extending back only in part from said ridge.

37. A damper according to claim 36 wherein said damper plate is imperforate.

38. A damper according to claim 36 wherein said damper plate is perforate.

39. A damper according to claim 36 wherein said damper further comprises an integral rib extending outwardly from said ridge along said damper plate.

* * * * *